Patented Oct. 7, 1930

1,777,447

UNITED STATES PATENT OFFICE

FREDERIC QUECK, OF MONROE, MICHIGAN

WATERPROOFING FIBROUS PRODUCT AND PROCESS OF PRODUCING THE SAME

No Drawing. Original application filed December 26, 1925, Serial No. 77,821. Divided and this application filed September 3, 1929. Serial No. 390,216.

My invention relates to a new and useful improvement in a waterproof fibrous product and process of producing the same and relates particularly to a process differing from the well known methods of impregnation and consists in absorption of an emulsion of water-proofing materials normally insoluble in water, but which are, in forming the emulsion, rendered soluble in water and after absorption rendered again insoluble, this application being a division of application Serial Number 77,821 filed December 26, 1925.

Another object of the invention is the forming of an emulsion or semi-solution in water from normally water insoluble materials and after absorption of the emulsion or semi-solution, in a carrying body rendering the normally water insoluble materials again water insoluble.

Another object of the invention is the provision of a waterproofing process whereby fibrous materials, and particularly paper, such as cardboard and the like, may be rendered waterproof with practically no alterations in the paper making process. The material is subjected to the waterproofing emulsion at the time and in the sequence where ordinarily the sizing is effected.

Other objects of the invention will appear as the description of the process and the product proceeds.

The process is used for making waterproof products such as paper, cardboard, textiles and similar articles, although from the description it will appear that various uses of the process will suggest themselves.

I prefer to use as the carrying body which forms the main body of the product a body made from wood pulp although for the purposes of carrying out the invention any fibrous body may be used with satisfactory results. The material when treated as herein described may be used for various purposes where a waterproof material is desired and in this connection I produce especially a waterproof paper and cardboard in order to arrive at the economy and simplicity of operation desired in a product of this kind for the purposes of commercial success as well as for the efficiency resulting from the use of the process.

In operation, there is used an emulsion or semi-solution in water in which the carrying body which is the fibrous product is thoroughly mixed by mechanical mixers or in any other desired manner, the mixing being thorough enough to permit absorption of the emulsion by the carrying body to the extension of saturation of the carrying part.

In making the emulsion or semi-solution in water, I use as a base preferably unsaponifiable matters such as asphalt, and industrial asphalt or by-products from the oil industry, such as the well known stanolite, the well known parolite, etc. Parolite and stanolite are the proprietary names of blown asphalts. These are characterized by good gloss and freedom from oily and greasy constituents and possess exceptional weather resisting properties. Attention is directed in this connection to the publication "Asphalt and Allied Substances,"—Abraham,—3rd edition, pages 334, 335 and 336.

These water insoluble materials which may be used are reduced to a liquid form by using heat.

In forming the emulsion I also use saponifiable matters such as rosin. The saponifiable matters are reduced to a state of soap by addition of suitable chemicals such as soda and similar alkalis. The saponifiable mixture is then added to the nonsaponifiable matter used and the result is the desired emulsion or semi-solution—the soap solution serving to emulsify the ingredients of the nonsaponifiable emulsion. The pulp is then thoroughly mixed in the emulsion by means of mechanical mixers such as beaters or of any well known type so that there is a complete and thorough ingraining of emulsion or semi-solution throughout the body of the fiber or pulp.

To produce the desired results it is necessary that the ingredients in the emulsion which are normally water insoluble and which have been rendered for the purpose of making the emulsion water soluble should again after the absorption by the pulp or fibrous material be made water insoluble to effect the waterproofing desired. To this end, I deliver to the pulp either after or at the same time as the pulp is being mixed or beaten in the emulsion acid or acid salts such as alum, sulphuric acid or any suitable substitute therefor.

Experience has shown that if acid or acid salts are delivered to the emulsion during the beating operation or at the same time the emulsion is poured upon the pulp that very efficient results are obtained due undoubtedly to the slow reaction to the acid salts or acid on the emulsion. It is apparent, however, that the acid or acid salts may be delivered to the emulsion after the completion of the absorption of the emulsion by the pulp.

After the complete absorption, as stated above, the pulp is then run through a regular paper machine or any well known type for pressing and drying the same. For absorbing the excess emulsion, fillers may be used which will add to the smoothness in the running of the paper machines and serve to prevent clogging of the machine, stickiness, and plugging up of the pores of the felt screens and rollers. These fillers are formed from suitable absorbing material as calcium sulphate powder, lamp black, starch, a low grade of flour, clay (aluminum silicate) or other finely powderized materials, the absorption of the excess emulsion by these fillers being preferably by direct contact.

In forming the emulsion, I prefer to use one part of saponifiable matters to four or five parts of non-saponifiable matters. In making the soap solution of the saponifiable matters, enough alkali is used to neutralize the saponifiable matters.

The acid or acid salts used as stated herein is used in sufficient proportion to give to the emulsion a positive acid reaction in excess.

In addition to the advantages already pointed out, the operation is one in which a wet process is used and there is an ingraining of the desired materials with the fibers while in wet condition. It is apparent that the normally water insoluble materials are first rendered water soluble, then thoroughly mixed with the fibers for effecting the desired absorption, and then again made water insoluble.

The product resulting from the process is water-proof to a very high degree and possesses a maximum efficiency as a water barrier.

The emulsion is one which is free from oil so that the resultant product when water proofed will be free from all oily substances and a consequent weakening of the papers which would be effected were oil or oily substances to be present, is prevented.

While I have illustrated the preferred method of carrying out the process, it will appear to those skilled in the art, variations may be made in the process without departing from the spirit of the present invention and it is my intention to bring these variations within the scope of the appended claims.

Having thus described my invention, what I claim as new and desire to secure by Letters Patent is:

1. The method of waterproofing a fibrous product consisting in saturating the product while in a non-felted state with an oil and grease free emulsion composed of an aqueous solution of rosin soap and a heat liquefied blown asphalt product, and the step of releasing the asphalt product from suspension in said emulsion, thus maintaining said fibrous product free from oily and greasy substances.

2. The method of waterproofing a fibrous product consisting in saturating the fibrous product with an oil and grease free emulsion composed of an aqueous solution of rosin soap and a heat liquefied blown asphalt product, and releasing the asphalt product from suspension during saturation, and thus maintaining said fibrous product free from any oily and greasy substances.

3. The method of waterproofing a fibrous product consisting in saturating the fibrous product with an oil and grease free emulsion composed of an aqueous solution of rosin soap and a heat liquefied blown asphalt product, and releasing the asphalt product from suspension subsequent to saturation, and thus maintaining said fibrous product free from any oily and greasy substances.

In testimony whereof I have signed the foregoing specification.

FREDERIC QUECK.